J. J. MOORE.
BIT FOR MINING MACHINES.
APPLICATION FILED APR. 15, 1912.
1,077,542.
Patented Nov. 4, 1913.
2 SHEETS—SHEET 2.
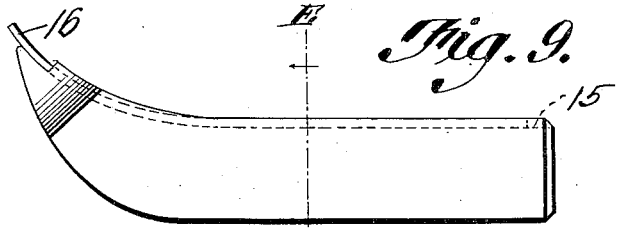
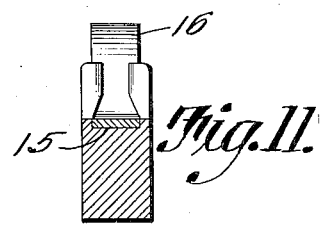
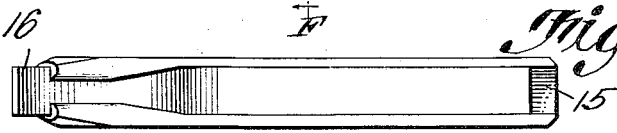
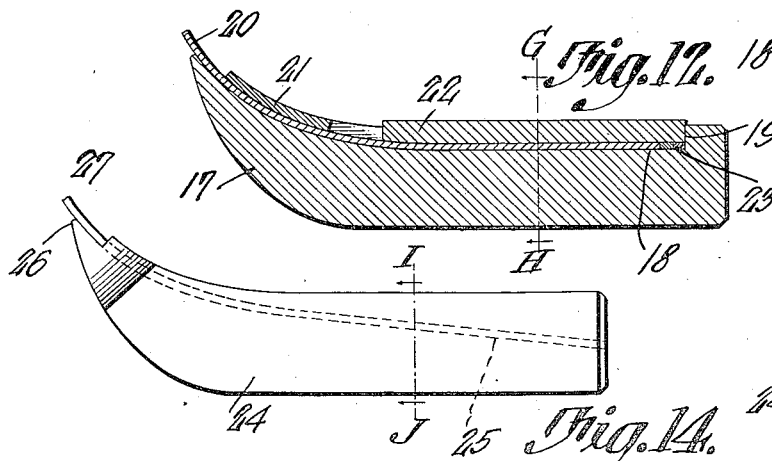
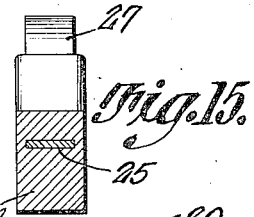
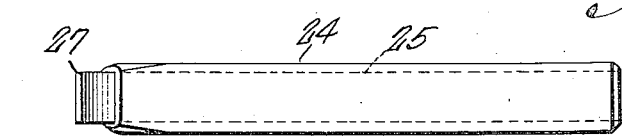
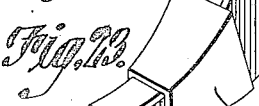
Witnesses
J. J. Moore  Inventor
by
Attorneys

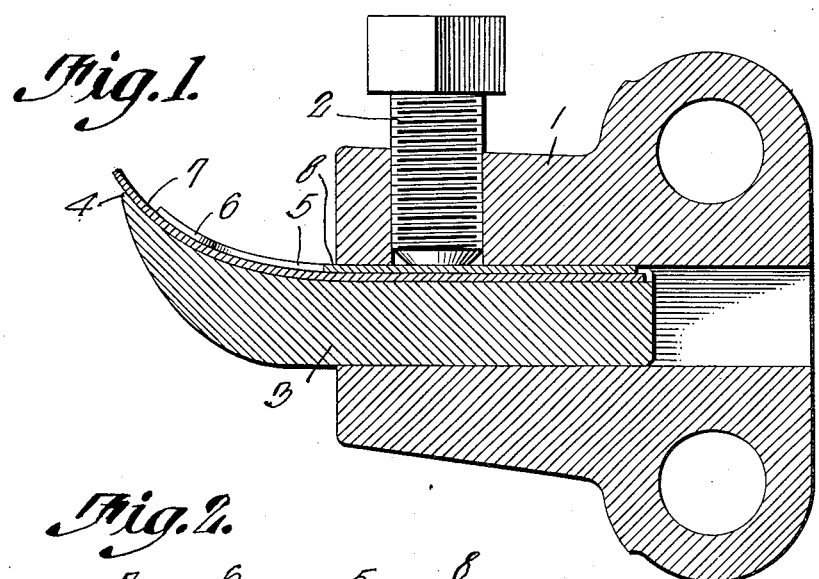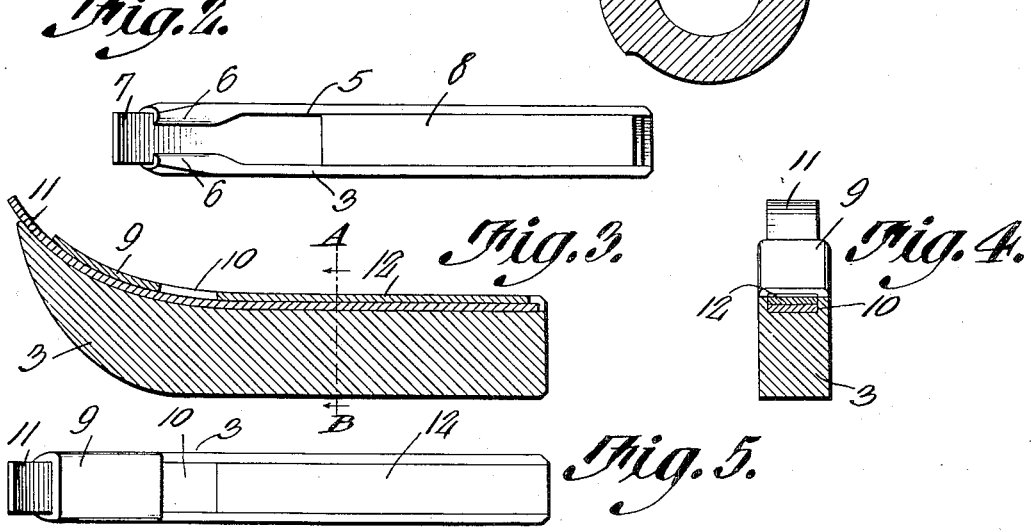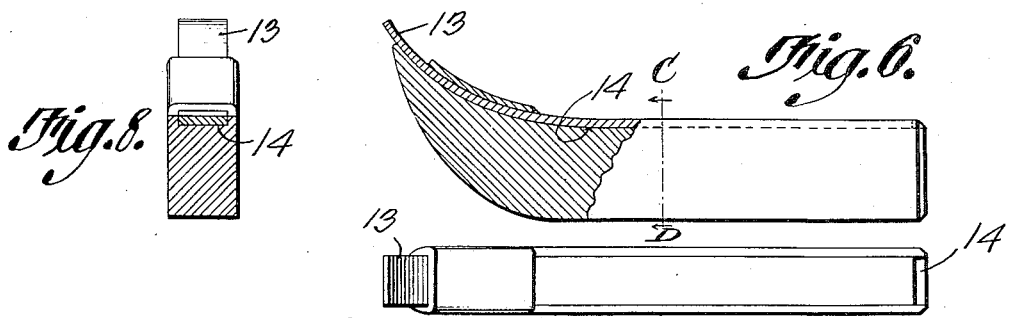

UNITED STATES PATENT OFFICE.

JUSTUS J. MOORE, OF SPRINGFIELD, ILLINOIS, ASSIGNOR OF ONE-FOURTH TO HARRY THOMAS, OF HARRISBURG, ILLINOIS, ONE-FOURTH TO W. A. BREWERTON, OF CHICAGO, ILLINOIS, AND ONE-FOURTH TO W. B. MAY, OF CLARKSBURG, WEST VIRGINIA.

BIT FOR MINING-MACHINES.

1,077,542.     Specification of Letters Patent.     Patented Nov. 4, 1913.

Application filed April 15, 1912. Serial No. 690,793.

*To all whom it may concern:*

Be it known that I, JUSTUS J. MOORE, a citizen of the United States, residing at Springfield, in the county of Sangamon and State of Illinois, have invented a new and useful Bit for Mining-Machines, of which the following is a specification.

This invention relates to bits for use in connection with mining machines. Bits of this type as heretofore constructed have been made in one piece. One piece bits, however, have been found objectionable because the cutting points thereof quickly become worn and often break, thus rendering the tool unfit for further use until it has been resharpened. As a result it has been found necessary to have men specially employed for sharpening the bits and this has, obviously, added considerable to the cost of mining. Furthermore, after the bits have been sharpened a number of times, they become unfit for further use and new ones must be substituted therefor.

It is the object of the present invention to provide bits the cutting points of which are formed by separate pieces carried thereby, these points being, in effect, self-sharpening.

A further object is to provide a cutting attachment for bits which can be adjusted, when unduly worn, so as to be projected beyond the end of the body portion of the bit, this adjustment being easily accomplished without the use of any special tools and mechanics.

Another object is to provide a tool of this character practically all of the wear on which is received by the adjustable member.

A further object is to provide a bit the wear element of which can be easily placed in or removed from position by the miner, the said element being so shaped and proportioned as to be easily carried in quantities without inconvenience so that, when an old one is removed from the bit, a new one can be easily substituted.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

In said drawings:—Figure 1 is a longitudinal section through one form of the bit in position within a socket. Fig. 2 is a plan view of the bit shown in Fig. 1. Fig. 3 is a longitudinal section through a modified form of bit. Fig. 4 is a section on line A—B Fig. 3. Fig. 5 is a plan view of the bit shown in Figs. 3 and 4. Fig. 6 is a view partly in side elevation and partly in section of another modified form. Fig. 7 is a plan view thereof. Fig. 8 is a section on line C—D Fig. 6. Fig. 9 is a side elevation of another modified form. Fig. 10 is a plan view thereof. Fig. 11 is a section on line E—F Fig. 9. Fig. 12 is a longitudinal section through another modification. Fig. 13 is a section on line G—H Fig. 12. Fig. 14 is a side elevation of another form of bit. Fig. 15 is a section on line I—J Fig. 14. Fig. 16 is a plan view of the bit shown in Figs. 14 and 15. Fig. 17 is a perspective view of another form of bit. Fig. 18 is a plan view of one form of cutting element. Fig. 19 is an end view thereof. Fig. 20 is a plan view of another form of cutting element. Fig. 21 is an end elevation thereof. Fig. 22 is a plan view of another form of cutting element. Fig. 23 is an end elevation thereof. Fig. 24 is a plan view of another modified form of cutting element. Fig. 25 is an end elevation thereof.

Referring to the figures by characters of reference 1 designates an ordinary type of socket such as commonly employed in connection with mining machines of the standard types, this socket being provided with a set screw 2 whereby the bit, after being inserted into the socket, can be securely held against displacement during the operation of the machine.

It might be stated, generally, that the bits constituting the present invention are of the usual or any preferred contour, and differ from the bits commonly used in that the points of the main portions or bodies of the bits do not engage the surface being cut but, instead, are disposed back of cutting elements which are detachably and adjustably mounted on the front or advancing faces of the bits, these elements being adapted to plow through the surface being cut and, as they become worn, being adapted to be adjusted a desired distance beyond the points of the bit bodies.

Various types of bits embodying the present improvements have been devised and have been illustrated in the accompanying drawings. In the form shown in Figs. 1 and 2 the bit body 3 has its active end curved and tapered to a blunt edge 4 which, under conditions as they have heretofore existed, has been sharpened and has constituted the cutting edge of the tool. In the present device, however, the front or advancing face of the bit body is channeled longitudinally, as shown at 5, this channel extending from one end to the other of the body and being provided, close to the edge 4, with side retaining flanges 6 overhanging the channel 5. The cutting element of the bit is seated within this channel and consists of a long strip 7 of metal sufficiently hard to do the necessary work, this strip fitting snugly against the side walls of the channel 5 and extending back of the flanges 6 so as to be held in position thereby along the curved portion of the channel. One end of the cutting element projects beyond the edge 4 of the body 3, as clearly shown in Fig. 1 so that said end, and not the edge 4, will perform the cutting operation during the actuation of the machine to which the bit is connected.

For the purpose of protecting the strip 7 from the abrasive action of the set screw 2, when said screw is tightened within the socket 1, a wear strip or shim 8 is arranged within the channel 5 between the cutting element 7 and the set screw 2 so that all wear caused by the set screw will be received by this shim.

It is to be understood that after the projecting or active end of the cutting strip or element 7 has become unduly worn, the said strip can be adjusted simply by removing the bit from the socket 1 and then tapping the strip 7 longitudinally within the channel so as to cause its active end to project the desired distance beyond the blunt end of the body 3. The shim 8 can then be replaced, the bit inserted in the socket, and set screw tightened whereupon the bit will be ready for further use. This operation can be repeated until the strip 7 becomes undesirably short whereupon said strip can be entirely removed and another one substituted therefor.

From the foregoing it is believed that the advantages of the present structure over the old type which requires constant resharpening by mechanics provided for that purpose, will be plainly apparent.

Instead of providing retaining flanges 6 for holding the cutting element 7 within the curved portion of the channel, a cross member 9 may be formed integral with the bit body 3 so as to bridge the curved portion of the channel as shown in Figs. 3, 4 and 5. In this modified structure the channel 10 in which the cutting element 11 is mounted is sufficiently deep to receive, in addition to said cutting element, a wear strip or shim 12 similar to the shim 8 shown in Figs. 1 and 2. If desired, however, and as shown in Figs. 6, 7 and 8, the shim may be dispensed with and the cutting strip or element 13 may be seated within a channel 14 the depth of which is substantially equal to the thickness of the cutting element. This type of bit is of course not as desirable as the type shown in Figs. 1 to 5 inclusive because the cutting element is engaged directly by the set screw 2 and thus becomes abraded to an undesirable extent. The bit will, however, work efficiently without the shim. The same is likewise true of the form illustrated in Figs. 1 and 2. If desired the shims shown in said figures can be dispensed with and the body of the bit can be formed with a channel 15 of a depth substantially equal to the thickness of the cutting element or strip 16, as shown in Figs. 9, 10 and 11.

Instead of extending a channel throughout the length of the bit body, said body, which has been indicated at 17 in Fig. 12, can be formed with a channel 18 extending up to a shoulder or abutment 19 and the cutting strip or element 20 may be seated in this channel and bear initially, against this abutment. The curved portion of the cutting element can be held in the channel by a cross member or bridge 21 similar to that shown in Figs. 3, 4 and 5 and a wear strip or shim 22 can be seated in the channel and bear against the abutment 19, this shim being contacted by the set screw 2 in the socket and thus protecting the intermediate portion of the cutting element from wear. The abutment 19 is constantly contacted by one end of the shim while the bit is in use but the cutting element 20 can be adjusted longitudinally, as in the structures heretofore described, and, if deemed desirable, one or more filling strips such as indicated at 23, may be interposed between the abutment 19 and the cutting element 20 so as positively to hold said element against slipping backwardly within the channel. It is to be understood of course that these filling devices are not necessary at all times as the pressure of the set screw upon the shim 22 will be such as to hold the cutting element against displacement within the channel.

In the form of bit shown in Fig. 14 the body 24 has a channel or passage 25 extending therethrough from the butt end of the body and opening through the front or advancing face of said body close to the tapered or blunt end 26 thereof. This channel or passage is straight for the greater portion of its length but is curved within the curved tapered end portion of the body. The cutting strip or element 27 is seated snugly within the passage or channel 25 and projects beyond the end 26 of the body as in the other types of bits heretofore described. The cutting element in this form can be adjusted simply by inserting a strip 27 or the like into the butt end of the passage 25 and tapping it so as to drive the active strip 27 longitudinally until its free end is projected the desired distance beyond the end 26 of the body 24.

As shown in Fig. 17 the body 28 of the bit can be formed with a channel 29 to receive the cutting strip or element 30 and said element may be retained within the curved portion of the channel by means of a tapered ferrule 31 fitting snugly on the rounded portion of the bit body or formed in one piece therewith.

It will be noted that in all types of bits herein described, the cutting ends of the elements project beyond the reduced blunt ends of the bit bodies. Inasmuch as the bits, while in use, travel along lines perpendicular to the longitudinal axes of the bits, it will be seen that the pressure against the active end of the cutting element 20 will be along a line extending past the blunt reduced end of the bit body. Thus the danger of pushing the cutting element 20 back up into the channel in which it is seated is minimized. However the pressure of the set screw 2 upon the bit will be ample to prevent any such shifting of the cutting element relative to the bit body.

It has been found that different forms of cutting elements can be used in connection with the bit bodies. For example, an elongated element square in cross sectional contour and as shown at 32 in Figs. 18 and 19 can be used in lieu of flat elongated strips 33 oblong in cross sectional contour as shown in Figs. 20 and 21. Or, if preferred, an elongated cutting strip 34 which is bowed transversely, as shown particularly in Fig. 23, can be used. This last form is especially desirable for the reason that where a flat cutting element is employed, it has been found that the corners of the active end thereof wear away faster than the intermediate portions. By using a strip which is bowed transversely, however, the active end thereof will wear away evenly. The same result can be obtained by using a cutting element made up of an elongated strip 35 V-shaped in cross section as shown in Figs. 24 and 25. It is to be understood of course that when strips such as shown in Figs. 22 and 24 are used the channels in the bits must be correspondingly shaped so that the cutting elements will fit snugly within them. After a machine has been equipped with the proper bit bodies, it is only necessary to keep on hand a supply of cutting elements designed for use in connection therewith and, as before stated, these can be quickly placed in position by the miner with but little loss of time.

It is to be understood of course that the bits can be used in connection with any forms of mining machines and can be grouped together in any desired relation or number.

An important advantage of the present device over bits such as heretofore used is found in the fact that after an ordinary form of bit has made three or four cuts it becomes dulled to such an extent as to pulverize the coal thereby greatly retarding the cutting action of the bit as well as producing considerable waste dust. In the present structure, however, the cutting element chips the coal at all times and the cutting action is thus greatly facilitated.

While the cutting element can be adjusted longitudinally by tapping it with a hammer or the like, it is to be understood that, if desired, it can be shifted by means of a suitable tool provided for drawing it longitudinally.

While channels are preferably used for holding the cutting elements, it is to be understood that these channels may be dispensed with should it be deemed desirable.

Although the cutting strip has been shown and described secured to the front or advancing face of the bit body and projecting beyond one end of the body, it is to be understood that under some conditions it may be found desirable to place the cutting strip upon one of the other faces of the body. Furthermore the cutting strip can be arranged with its active end flush with the end of the body instead of projecting therebeyond, this being particularly permissible when the body of the bit is formed of a metal much softer than that of which the cutting strip is made. These modified forms are so obvious that it has not been deemed necessary to illustrate them.

What is claimed is:—

1. A bit for mining machines including a body having one end portion curved forwardly, the front and back faces of said portion converging to an edge, a longitudinal channel within the front face of the body and of said curved portion, said channel extending longitudinally of the bit, a cutting element seated within the channel and projecting at one end to the edge of the bit, and means integral with the body and overlapping a portion of the cutting element to hold said element within that portion of the channel in the curved portion of the bit.

2. A bit for mining machines, including a body having one end portion curved forwardly, there being a longitudinal channel within the front face of said curved portion, a cutting element seated within the channel and extending to the end of the curved portion, and means integral with the body and engaging the said cutting element for holding the cutting element seated in that portion of the channel in the curved portion.

3. A bit for mining machines, including a body having one end portion curved forwardly, there being a longitudinal channel within the front face of the body and within the front or concaved face of said curved portion, a cutting element seated within the channel and extending to the end of the curved portion, and means integral with the body for overlapping a portion of the cutting element to hold said portion seated within that part of the channel in the curved portion.

4. In a mining machine the combination with a socket member, of a bit detachably seated therein and having one end portion extended forwardly, there being a longitudinal channel within the front face of the body and forwardly extended portion of the bit, a cutting element seated within the channel and projecting to the end of the forwardly projecting portion, means integral with the body for engaging a portion of the cutting element to hold said portion seated within that part of the channel located in the forwardly extending portion of the bit, and a set screw engaging the socket member for binding the cutting element upon the bit and for binding the bit in the socket member.

5. In a mining machine the combination with a socket member, of a bit seated therein, a cutting element mounted upon one face of the bit and projecting to one end thereof, and a set screw engaging the socket member for binding the cutting element upon the bit and for binding the bit upon the socket member.

6. A bit for mining machines, including a body having a longitudinal channel, a portion of said channel being curved back into the body, a cutting element adjustably and detachably mounted within the channel and projecting to one end of the body, and means integral with the body for overlapping a portion of the element to hold it in the curved portion of the channel.

7. In a mining machine the combination with a socket member, of a bit detachably mounted therein and including a body having its front or advancing face curved forward to a blunt edge, there being a longitudinal channel in the advancing face of the body, a cutting element detachably and adjustably seated in the channel and projecting to said blunt edge, and means connected to the socket for binding said cutting element to the body and for holding the body within the socket.

In testimony that I claim the foregoing as my own, I have hereto affixed my signature in the presence of two witnesses.

JUSTUS J. MOORE.

Witnesses:
SELINA WILLSON,
MONROE E. MILLER.